(12) United States Patent
Yasui et al.

(10) Patent No.: US 9,164,287 B2
(45) Date of Patent: Oct. 20, 2015

(54) STEREOSCOPIC IMAGE DISPLAY DEVICE

(71) Applicant: Mitsubishi Electric Corporation, Tokyo (JP)

(72) Inventors: Hironobu Yasui, Tokyo (JP); Masaaki Hanai, Tokyo (JP); Hideki Yoshii, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 389 days.

(21) Appl. No.: 13/886,917

(22) Filed: May 3, 2013

(65) Prior Publication Data

US 2013/0314629 A1 Nov. 28, 2013

(30) Foreign Application Priority Data

May 25, 2012 (JP) ................................. 2012-119301

(51) Int. Cl.
G02B 27/22 (2006.01)
H04N 13/04 (2006.01)

(52) U.S. Cl.
CPC .................................. *G02B 27/2264* (2013.01)

(58) Field of Classification Search
CPC .......... H04N 13/0497; H04N 13/0438; H04N 13/0434; G09G 3/003; G02B 27/2264
See application file for complete search history.

(56) References Cited

U.S. PATENT DOCUMENTS 8,035,603 B2 * 10/2011 Furukawa et al. ............. 345/102
2006/0268104 A1 * 11/2006 Cowan et al. ................... 348/42
2008/0112164 A1 5/2008 Teshirogi
2010/0259603 A1 * 10/2010 Mihara et al. ................... 348/53
2010/0289883 A1 * 11/2010 Goris et al. ...................... 348/56

(Continued)

FOREIGN PATENT DOCUMENTS

CN 101178874 A 5/2008
CN 101536068 A 9/2009

(Continued)

OTHER PUBLICATIONS

Chinese Office Action for Chinese Application No. 201310194123.9, dated Nov. 15, 2014, along with an English translation thereof.

*Primary Examiner* — Brian Yenke
(74) *Attorney, Agent, or Firm* — Birch, Stewart, Kolasch & Birch, LLP (57) ABSTRACT

A stereoscopic image display device includes a liquid crystal panel section, a light source section, a light detection section, a light source control section, a shutter glasses section, and a timing generation section generating a light emission drive signal, a light detection gate signal, and shutter switching signals in synchronization with an image synchronization signal. The timing generation section, generates the light emission drive signal which causes each of the regions of the light source section to emit light in accordance with scanning performed in the liquid crystal panel section, and which causes all the regions of the light source section to emit light in a predetermined period, and generates the light detection gate signal which enables detection of the light detection section in the predetermined period, and generates the shutter switching signals for switching left and right shutters to a non-transmissive mode.

9 Claims, 7 Drawing Sheets

(56) References Cited

U.S. PATENT DOCUMENTS

| | | | |
|---|---|---|---|
| 2011/0074937 A1* | 3/2011 | Nakahata | 348/56 |
| 2011/0234777 A1* | 9/2011 | Kobayashi et al. | 348/56 |
| 2011/0292040 A1* | 12/2011 | Chiba | 345/419 |
| 2011/0304712 A1* | 12/2011 | Koobayashi et al. | 348/51 |
| 2012/0038691 A1 | 2/2012 | Lee et al. | |
| 2012/0062539 A1* | 3/2012 | Koyama | 345/211 |
| 2012/0081624 A1* | 4/2012 | Kobayashi et al. | 349/15 |
| 2012/0092331 A1* | 4/2012 | Ogawa et al. | 345/419 |
| 2012/0105605 A1 | 5/2012 | Nam et al. | |
| 2012/0113159 A1 | 5/2012 | Chiba et al. | |
| 2012/0154555 A1* | 6/2012 | Iwanaka et al. | 348/51 |
| 2012/0188348 A1* | 7/2012 | Umeda et al. | 348/54 |
| 2012/0200800 A1 | 8/2012 | Kurita | |
| 2012/0262556 A1* | 10/2012 | Kuwahara et al. | 348/51 |
| 2013/0286167 A1* | 10/2013 | Kobayashi et al. | 348/51 |
| 2013/0314641 A1* | 11/2013 | Okuda et al. | 349/61 |
| 2015/0130864 A1* | 5/2015 | Ahn et al. | 345/691 |

FOREIGN PATENT DOCUMENTS

| | | |
|---|---|---|
| CN | 102036082 A | 4/2011 |
| CN | 102263971 A | 11/2011 |
| CN | 10239623 A | 3/2012 |
| CN | 102376268 A | 3/2012 |
| CN | 102457747 A | 5/2012 |
| CN | 102469327 A | 5/2012 |
| JP | 11-295689 | 10/1999 |
| JP | 2010-276928 A | 12/2010 |
| JP | 2011-22541 A | 2/2011 |
| JP | 2011-112745 A | 6/2011 |
| JP | 2011-141324 A | 7/2011 |
| JP | 2012-182112 A | 9/2012 |
| TW | 200912873 A | 3/2009 |
| TW | 201201177 A | 1/2012 |
| WO | WO 2010/151298 A1 | 12/2010 |

* cited by examiner

STEREOSCOPIC IMAGE DISPLAY DEVICE

BACKGROUND OF THE INVENTION

1. Field of the Invention

The present invention relates to a stereoscopic image display device which displays a right-eye dedicated image and a left-eye dedicated image on a liquid crystal panel in a time-sharing manner, and which displays a stereoscopic image separating the right-eye dedicated image and the left-eye dedicated image from each other through use of shutters.

2. Description of the Background Art

In recent years, as an image displaying technique for allowing the user to virtually experience stereoscopic viewing, the stereoscopic image displaying technique using parallax between the eyes is known. As such a stereoscopic image displaying technique, the following scheme is proposed. A left-eye dedicated image and a right-eye dedicated image are temporally alternatively displayed on a display device. At the same time, in synchronization with the timing at which the images are switched, the right and left field of views are temporally separated from each other through use of shutter glasses, which shut the right and left field of views, respectively. Thus, the right-eye dedicated image and the left-eye dedicated image are presented to the right and left eyes of the user, respectively.

Such a stereoscopic image display device involves problem of 3D crosstalk, i.e., the left-eye dedicated image not intended to be incident upon the right eye of the user is incident upon the right eye, or the right-eye dedicated image not intended to be incident upon the left eye is incident upon the left eye.

Further, such a stereoscopic image display device involves another problem. That is, the luminance and white color of the light source used as the backlight, which emits light on the back side of the liquid crystal panel, change because of variations in temperature and aging.

Addressing such problems, a liquid crystal display device of Japanese Patent Application Laid-Open No. 11-295689 (1999) discloses a technique of employing three types of backlight differing from one another in illumination colors and optical sensors corresponding to the illumination colors, to thereby achieve the operation in which the illumination colors are always equal to set values, despite the variations in temperature and aging of the backlight.

A stereoscopic video display device of Japanese Patent Application Laid-Open No. 2010-276928 discloses a technique of suppressing 3D crosstalk by allowing scanning to be performed with divided backlights in synchronization with a video image such that the backlights are successively lit up for short periods (backlight scanning).

However, in an attempt to solve the two problems noted above at the same time, when the backlight sources of different illumination colors are used as in the liquid crystal display device of Japanese Patent Application Laid-Open No. 11-295689 (1999), and control is exerted to perform scanning with the divided backlight sources in synchronization with an image such that light is successively emitted for short periods as in the stereoscopic video display device of Japanese Patent Application Laid-Open No. 2010-276928, the optical sensors will be affected by the light amount of adjacent backlight sources. Thus, it invites problem of the output values of the optical sensors not becoming constant. Accordingly, it is difficult to maintain the illumination colors of the backlight sources to be constant against variations in temperature and aging of the backlight sources.

SUMMARY OF THE INVENTION

An object of the present invention is to provide a stereoscopic image display device being capable of maintaining the illumination colors of a light source section to be constant against variations in temperature and aging of the light source section and being capable of suppressing 3D crosstalk, through use of the light source section being divided into a plurality of regions.

A stereoscopic image display device of the present invention includes a liquid crystal panel section in which successive scanning is performed in a predetermined direction in synchronization with an image signal, so that transmittance of light is varied in accordance with a gray scale level of the image signal; a light source section being divided into a plurality of regions; a light detection section detecting light emission intensity of the light source section; a light source control section controlling the light emission intensity of the light source section based on a light detection value detected by the light detection section; a shutter glasses section having left and right shutters, the shutter glasses section switching the left and right shutters between a transmissive mode and a non-transmissive mode; and a timing generation section generating, in synchronization with an image synchronization signal, a light emission drive signal causing the light source section to emit light, a light detection gate signal causing the light detection section to detect the light emission intensity of the light source section, and a shutter switching signal for causing the left and right shutters to switch between the transmissive mode and the non-transmissive mode. The timing generation section, generates the light emission drive signal which causes each of the regions of the light source section to emit light in accordance with the scanning performed in the liquid crystal panel section, and which causes all the regions of the light source section to emit light in a predetermined period, and generates the light detection gate signal which enables detection of the light detection section in the predetermined period, and generates and the shutter switching signal for switching the left and right shutters to the non-transmissive mode.

According to the present invention, the timing generation section generates the light emission drive signal which causes all the regions of the light source section to emit light in a predetermined period and the light detection gate signal which enables detection of the light detection section. Therefore, the light detection section can perform detection in the state where all the regions of the light source section are caused to emit light at the same time. Therefore, the light detection section can perform stable detection of the light detection value with small errors, without being affected by the amount of light of adjacent regions in the light source section. Since the light source control section controls the light emission intensity of the light source section based on the light detection value with small errors, the illumination color of the light source section can be maintained to be constant against variations in temperature and aging of the light source section.

Further, the timing generation section generates the shutter switching signal for switching the left and right shutters to the non-transmissive mode in the predetermined period. Therefore, by switching the left and right shutters to the non-transmissive mode in the period where all the regions of the light source section are caused to emit light at the same time, it becomes possible to suppress occurrence of 3D crosstalk attributed to the light emission of the light source section.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
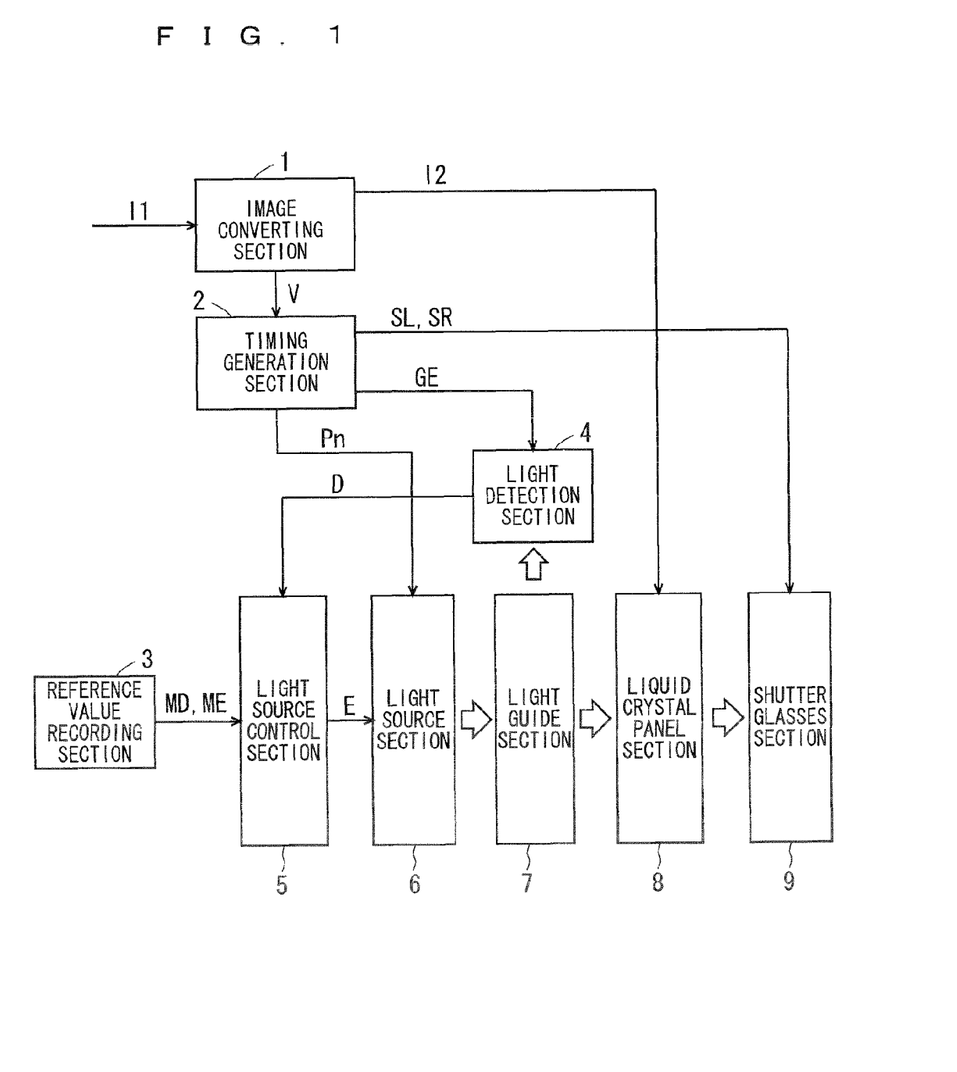
FIG. 1 is a block diagram of a stereoscopic image display device according to a first preferred embodiment.

A description will be given of a first preferred embodiment of the present invention with reference to the drawings. FIG. 1 is a block diagram of a stereoscopic image display device according to the first preferred embodiment of the present invention. As shown in FIG. 1, the stereoscopic image display device includes an image converting section 1, a timing generation section 2, a reference value recording section 3, a light detection section 4, a light source control section 5, a light source section 6, a light guide section 7, a liquid crystal panel section 8, and a shutter glasses section 9.

Figure 3:
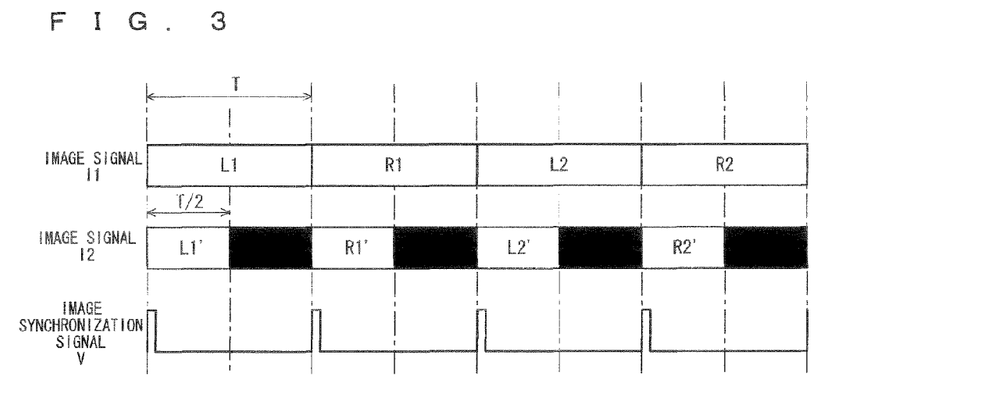
FIG. 3 is a timing chart showing the operation of an image converting section.

Next, a description will be given of constituent elements. As shown in FIG. 3, it is understood that an image signal I1 input to the image converting section 1 is an image in which a left eye image L and a right eye image R are sorted to form a pair of left eye image and right eye image in a time-sharing manner. Further, the description will be given based on that one image frame time of the left eye or the right eye is T.

As shown in FIGS. 1 and 3, the image converting section 1 converts the image signal I1 such that the frame frequency is doubled, and inserts one black image between a left eye image L' and a right eye image R', to generate an image signal I2. That is, the one image frame time of the image signal I2 for the left or right eye becomes T/2. Further, the image converting section 1 outputs an image synchronization signal V indicative of the head timing of the left eye image L' and that of the right eye image R' synchronized with the image signal I2 to the timing generation section 2.

As shown in FIG. 1, the timing generation section 2 generates a light emission drive signal Pn of the light source section 6 based on the image synchronization signal V output from the image converting section 1 and the number of vertical division n of the light source section 6, and outputs the generated light emission drive signal Pn to the light source section 6. Further, the timing generation section 2 generates a light detection gate signal GE and outputs the same to the light detection section 4. Further, the timing generation section 2 generates shutter switching signals SL, SR, and outputs the same to the shutter glasses section 9. Here, the light emission drive signal Pn is output as many as the number of vertical division n, and the light detection gate signal GE is output as many as the number of optical sensors (not shown) of the light detection section 4.

The reference value recording section 3 records and retains a reference light detection value MD and a reference light emission intensity value ME, which are set previously by the user. The reference light detection value MD exists as many as the number of combination of the number of installed optical sensors of the light detection section 4 and the colors of the sensors, and the reference light emission intensity value ME exists as many as the number of combination of the number of divided regions of light source section 6 and the number of colors.

In connection with the scheme of determining the reference light detection value MD and the reference light emission intensity value ME, the output light from the liquid crystal panel section 8 or the output light from the shutter glasses section 9 upon receipt of a reference signal, e.g., a full white signal, is measured by a luminance meter being externally installed, and the light emission intensity value of each color of the light source section 6 is adjusted such that the output light achieves the targeted luminance, white balance, color temperature and the like.

Further, the light emission intensity value of each of the divided regions of the light source section 6 is adjusted, such that the variations in luminance and color of the liquid crystal panel section 8 become uniform. In this manner, the reference value recording section 3 records and retains the light detection value of each optical sensor, which is obtained at the time when the output light from the liquid crystal panel section 8 and the output light from the shutter glasses section 9 are adjusted to the targeted value, as the reference light detection value MD. Further, the reference value recording section 3 records and retains the light emission intensity value being input to each of the divided regions of the light source section 6 as the reference light emission intensity value ME.

The light detection section 4 includes, in the light source section 6, a plurality of optical sensors capable of detecting light emission intensity of at least one color, to perform light detection in High period of the light detection gate signal GE output from the timing generation section 2, and outputs a light detection value D. The light detection section 4 outputs, as the light detection value D, a voltage value being proportional to the light emission intensity, for example.

Further, the light detection section 4 may be one luminance sensor capable of detecting a luminance value, or may be color sensors of three colors, namely, red (R), green (G), and blue (B). The type of such sensors is not limited, and may be, for example, a photocell, a photodiode, or a combination of such optical filters. With multicolor optical sensors, the light detection value D is output as many as the number of colors.

The light source control section 5 outputs, for the first time immediately after being activated, the reference light emission intensity value ME recorded in the reference value recording section 3 to the light source section 6. From the second time onward, the light source control section 5 determines a light emission intensity value E such that the light detection value D output from the light detection section 4 and the reference light detection value MD become equal to each other, and outputs the determined light emission intensity value E to the light source section 6. Here, the light emission intensity value E is the current amount, for example. It is understood that the light amount increases in proportional to the light emission intensity value E when the light emission intensity value E is input to the light source section 6.

Specifically, when the light detection value D is smaller than the reference light detection value MD, the light source control section 5 increases the light emission intensity value E such that the light detection value D and the reference light detection value MD become equal to each other and outputs the same. On the other hand, when the light detection value D is greater than the reference light detection value MD, the light source control section 5 reduces the light emission intensity value E such that the light detection value D and the reference light detection value MD become equal to each other and outputs the same. In this manner, by the light source control section 5 operating to equalize the light detection value D and the reference light detection value MD, the light emission intensity of the output light achieves the targeted value. Note that the light emission intensity value E is output from the light source control section 5 as many as the number of divided regions of the light source section 6.

The light source section 6 is divided into a plurality of regions in the vertical direction of the liquid crystal panel section 8. That is, the light source section 6 is divided by n (n≥2) so as to be divided into at least the top portion region and the bottom portion region. Further, the light source section 6 is structured with the light source of at least one color. Still further, the light source section 6 is the light source which emits pulsed light at the light emission intensity value E output from the light source control section 5 in High period of the light emission drive signal Pn output from the timing generation section 2. Here, the outline arrows in FIG. 1 each represent light.

The light source section 6 may produce white light by blending light through use of a combination of multicolor light sources, e.g., a combination of three color light sources of red (R), green (G), and blue (B), or a combination of two color light sources of cyan (C) and red (R). Any element can be used as the light emitting element of each light source, e.g., a light emitting diode (LED), laser, an organic electroluminescence (organic EL) or the like, or combinations thereof. It is understood that the light source section 6 is capable of controlling the divided light sources (regions) independently of one another. The light source section 6 may be installed immediately below the liquid crystal panel section 8, or may be installed right and left ends and top and bottom ends of the liquid crystal panel section 8.

The light source section 6 performs pulsed light emission based on the light emission drive signal Pn. Further, the light source section 6 is capable of changing the light emission intensity depending on the light emission intensity value E. The light emission drive signal Pn exists as many as the number of vertical division n. The light source section 6 emits light in High period of the light emission drive signal Pn, and the light emission intensity is set by the light emission intensity value E. Further, the light source section 6 is turned off in Low period. The light emission intensity value E may be: the number of combination of the number of vertical division n and the number of light source color m; or the number of light source color m. Alternatively, it may be the number of vertical division n, or may be just one.

The light guide section 7 outputs light, which has been received from the light source section 6, to a predetermined region of the liquid crystal panel section 8. The light evenly diffuses on the incident surface of the liquid crystal panel section 8, whereby the area light source is achieved. Further, the light guide section 7 also has the function of producing white color by blending light from the light source section 6 which employs a combination of multicolor light sources, e.g., red (R), green (G), and blue (B). Still further, the light guide section 7 may be structured to cause the light diffusion entirely with one light guide plate, even when the light source section 6 is divided into n regions.

The liquid crystal panel section 8 is, for example, a transmissive liquid crystal panel in which the color filters are arranged. In the liquid crystal panel section 8, successive scanning is performed from top to bottom in synchronization with the image signal I2 output from the image converting section 1. Then, as the timing generation section 2 causes each region of the light source section 6 to emit light in accordance with the scanning in the liquid crystal panel section 8, the liquid crystal panel section 8 displays an image by varying the transmittance of the light from the back side for each pixel in accordance with the gray scale level of the image signal I2.

The shutter glasses section 9 has a left eye shutter (not shown) and a right eye shutter (not shown), and switches the left and right eye shutters between a transmissive mode and a non-transmissive mode in accordance with the shutter switching signals SL, SR output from the timing generation section 2.

Here, the left-eye dedicated shutter switching signal is denoted by SL and the right-eye dedicated shutter switching signal is denoted by SR. The shutter switching signals SL, SR allow an image to be transmissive based on that the shutter being open in High period, and allows an image to be non-transmissive based on that the shutter being closed in Low period. Allowing the user to look an image displayed on the liquid crystal panel section 8 while showing only the left eye image to the left eye and only the right eye image to the right eye through use of the shutter glasses section 9, the user can observe the image as a stereoscopic image.

Note that the shutters switching the image between the transmissive mode and the non-transmissive mode can be structured in any manner. For example, it may be structured based on the combination of a polarizing plate and liquid crystal switching its polarizing direction, such that the transmissive mode is set when the polarizing angle is in an identical direction, and that the non-transmissive mode is set when the polarizing angle is in the closing direction. Alternatively, it may be structured to physically close. Further, any method may be employed for transmitting the shutter switching signals SL, SR, e.g., infrared rays, radio waves, wired transmission or the like.

Figure 2:
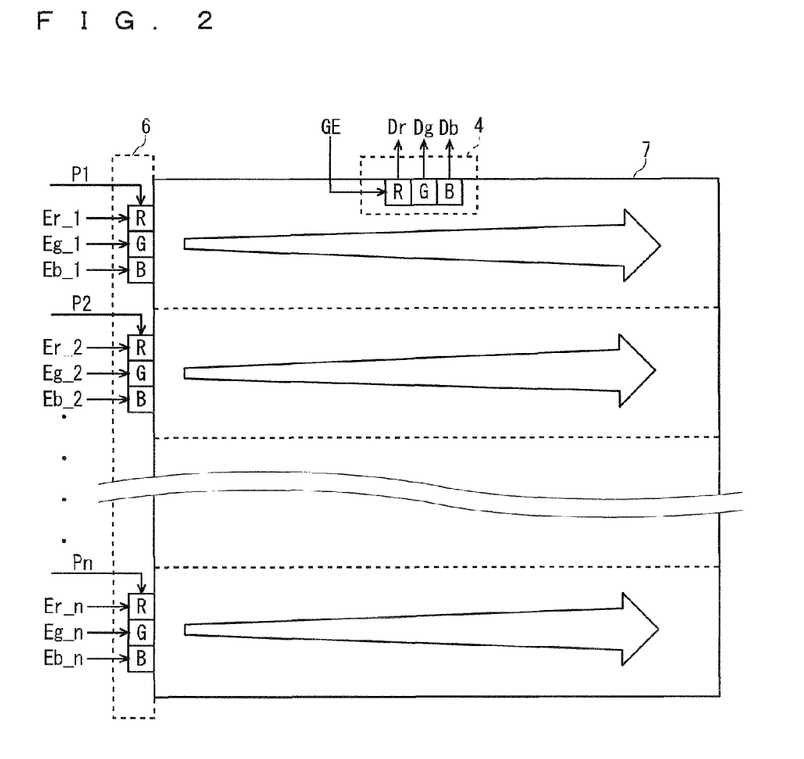
FIG. 2 is a diagram showing the installation state of a light guide section, a light source section, and a light detection section on the back side of a liquid crystal panel section.

Next, a description will be given of the installation of the light guide section 7, the light source section 6, and the light detection section 4. FIG. 2 is a diagram showing the installation state of the light guide section 7, the light source section 6, and the light detection section 4 on the back side of the liquid crystal panel section 8. On the back side of the liquid crystal panel section 8, a light guide plate of the light guide section 7 is installed. The light source section 6 is installed at the left end of the light guide plate. The light source section 6 includes n regions provided in the vertical direction, the regions being capable of being controlled independently of one another.

The light emitted by the light source section 6 is diffused across the surface by the light guide section 7, and guided to the right end of the liquid crystal panel section 8. The light detection section 4 detects the light emission intensity of the diffused light. The light guide section 7 has the function of diffusing light across a considerably wide surface without unevenness. Therefore, it is not only each range indicated by the dashed lines in FIG. 2 that lights up. Instead, the resultant light amount is the overlapped light from the adjacent light sources or from all the light sources being considerably away from one another. Note that the light detection section 4 may be provided at an arbitrarily position between the light guide section 7 and the liquid crystal panel section 8. Further, the light detection section 4 may be installed in one place or in a plurality of places. In the case where the light detection section 4 is installed in each of a plurality of places, the light detection control is exerted by associating the light detection section with each of the divided regions of the light source section 6.

Next, with reference to FIG. 3, a detailed description will be given of the operation of the image converting section 1. FIG. 3 is the timing chart showing the operation of the image converting section 1. As shown in FIG. 3, the image converting section 1 converts the image signal I1 such that the frame frequency is doubled, and inserts one black image between the left eye image L' and the right eye image R' to generate the image signal I2. The generated image signal I2 is output to the liquid crystal panel section 8.

In the case where the image signal I1 is input in order of L1, R1 . . . with one image frame period (cycle) T, the output image signal I2 is converted such that the frame frequency is doubled, and thereafter converted to achieve the order of L1', black, R1', black . . . with one image frame period T/2. This black image is inserted for the purpose of separating the left eye image and the right eye image from each other. Further, the image converting section 1 outputs the image synchronization signal V indicative of the head timing of the left eye image L' and that of the right eye image R' being synchronized with the image signal I2 to the timing generation section 2. Here, the pulse width of the image synchronization signal V may be an arbitrary width, because the rising of the image synchronization signal V is used as the reference.

The image signal I2 output from the image converting section 1 is input to the liquid crystal panel section 8. In the liquid crystal panel section 8, successive scanning is performed from top to bottom in synchronization with the image signal I2, to vary the transmittance. That is, the variation begins at different times between the top portion and bottom portion of the liquid crystal panel section 8. Further, the liquid crystal is slow in responding by varying the transmittance, and the liquid crystal responds such that the targeted transmittance is gradually achieved. Here, the transmittance appears as gray scale levels.

Figure 4:
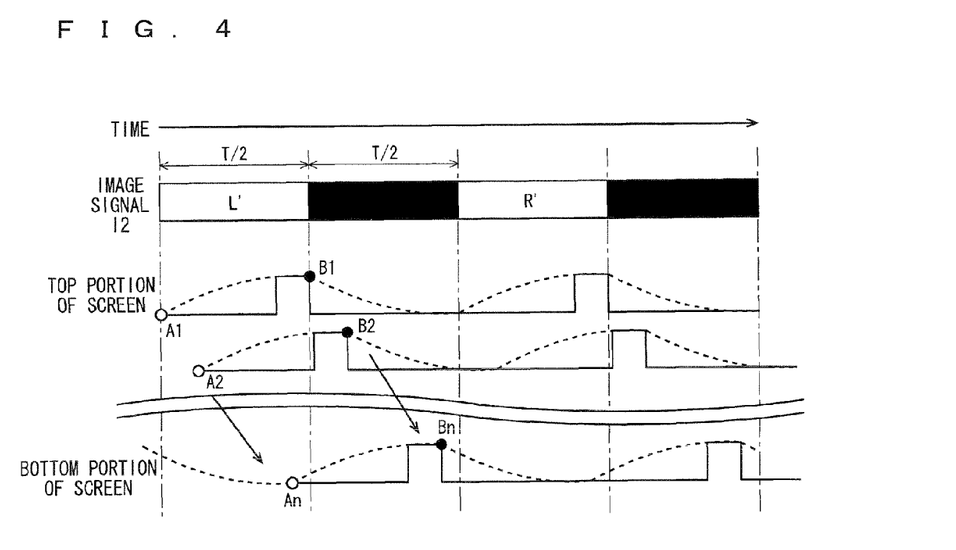
FIG. 4 is a timing chart showing the relationship between the response of liquid crystal to an image signal and a light emission drive signal.

Next, with reference to FIG. 4, a description will be given of the relationship between the response of liquid crystal to the image signal I2 and the light emission drive signal Pn. FIG. 4 is a timing chart showing the relationship between the response of liquid crystal to the image signal I2 and the light emission drive signal Pn. Here, it is understood that the light source section 6 is divided into n regions in the vertical direction of the liquid crystal panel section 8 and that the divided regions are capable of being controlled independently of one another. Similarly, in the case where the light source section 6 is divided into a plurality of regions also in the horizontal direction of the liquid crystal panel section 8, control is exerted for each of those regions divided in the vertical direction. For the sake of convenience, it is understood that, in the image signal I2 being input to the liquid crystal panel section 8, both the left eye image L' and the right eye image R' are full white images.

In FIG. 4, the horizontal axis indicates time, and each wavy line indicates the response of liquid crystal. When the wavy line rises, the transmittance increases; when the wavy line lowers, the transmittance reduces. Point A1 is the point where the write operation of the left eye image L' corresponding to the area near the topmost portion of the liquid crystal panel section 8 is performed with the gray scale level. The liquid crystal begins gradually responding by white being written, and the transmittance increases. Point B1 is the point where the write operation of the black image, which is the next frame, is performed. By black being written, the transmittance of the liquid crystal gradually reduces. It can be seen that the point immediately before point B1 is the point where an adequate response time has elapsed, and where the substantially targeted transmittance corresponding to the left eye image L' is achieved. This is the example where the response of liquid crystal is slow. In the case where the response of liquid crystal is fast enough, the response converges prior to that point and the transmittance becomes constant. That is, it can be seen that it is optimum to cause the light source section 6 to emit light with reference to point B1.

On the other hand, point An is the point where the write operation of the left eye image L' corresponding to the bottommost portion of the liquid crystal panel section 8 is performed with the gray scale level. Point An is shifted rightward in accordance with the lapse of time from point A1. Point Bn is the point where the write operation of the black image at the bottommost portion of the liquid crystal panel section 8 is performed. It can be seen that, at the bottommost portion of the liquid crystal panel section 8 also, the point immediately before point Bn is the point where the substantially targeted transmittance corresponding to the left eye image L' is achieved.

In this manner, it is optimum to cause the light source section 6 to emit light with reference to the area near points B1, B2, Bn. That is, it is desirable that the light source section 6 is controlled to emit light while successively shifting in accordance with the number of vertical division n, such that the light source section 6 emits light immediately before a change takes place in the next frame, in synchronization with the scan timing of the image.

Each solid line represents the light emission drive signal Pn of the light source section 6. The light emission drive signal Pn is successively shifted employing the area near points B1, B2, Bn as the reference of falling, to cause the light source section 6 to emit light. Here, the light emission drive signal Pn of the light source section 6 shows that Low level turns off the light source section 6 and High level causes the light source section 6 to emit light. The shift amount is determined by the cycle of the image synchronization signal V and the number of vertical division n of the light source section 6.

Figure 5:
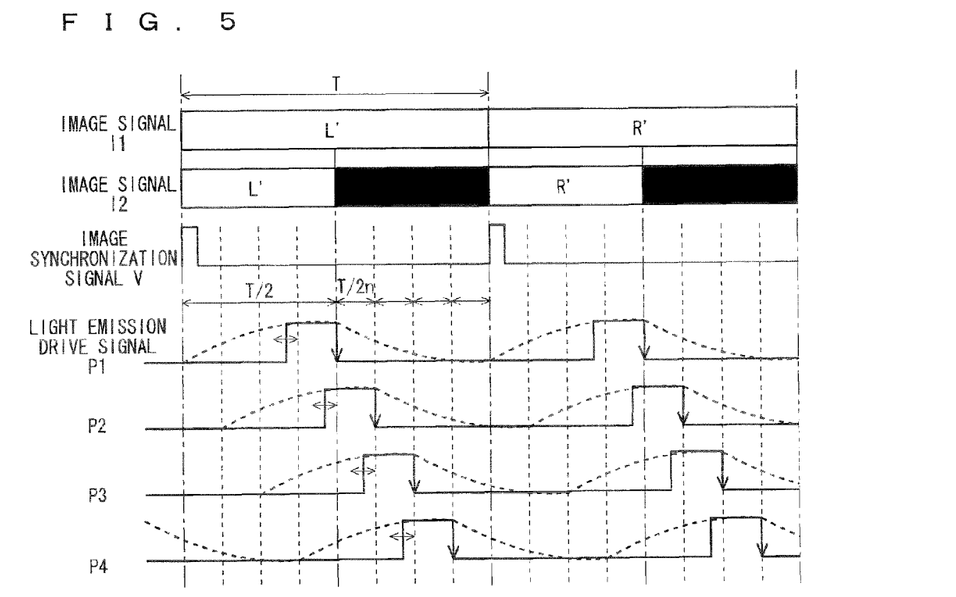
FIG. 5 is an exemplary timing chart showing the timing of generating the light emission drive signal.

Next, with reference to FIG. 5, a description will be given of the timing of generating the light emission drive signal Pn. FIG. 5 is an exemplary timing chart showing the timing of generating the light emission drive signal Pn. The image synchronization signal V indicates the head timing of the left eye image L' and that of the right eye image R' being in synchronization with the image signal I2. The cycle of the image synchronization signal V is T. In connection with the light emission drive signal in FIG. 5, the wavy line represents the response of liquid crystal, while the solid line represents the light emission drive signal Pn of the light source section 6. For the sake of convenience, the description will be given of the case where the number of vertical division n of the light source section 6 is 4.

By employing the area near point Bn shown in FIG. 4 as the light emitting period of the light source section 6, the optimum light emission timing with which the response of liquid crystal is considered is achieved. That is, it is designed such that the falling point of the light emission drive signal Pn is in the area near point Bn. The shift amount S of the light emission drive signal Pn is determined by the cycle T of the image synchronization signal V and the number of vertical division n of the light source section 6, which is expressed by the following equation:

$$S = T/2n$$

When T/2 period has elapsed since the rising of the image synchronization signal V, the timing generation section 2 causes the first light emission drive signal P1 to fall, to generate the light emission drive signal Pn as being time-shifted by the shift amount S. For example, with the light source section 6 with four divided regions, the falling point of the light emission drive signal P1 is point T/2, and the falling point of the light emission drive signal P2 is point T/2+T/8.

High period of the light emission drive signal Pn is the light emitting period of the light source section 6. When the luminance is to be increased, only the rising timing is changed while the falling timing is unchanged, to thereby increase High period. In this manner, luminance is adjusted with the falling timing of the light emission drive signal Pn being fixed and the rising timing being adjusted. This rising timing adjustment is represented by double-headed arrows.

The image signal I2 is a signal in which the black image for one screen is inserted between the left eye image L' and the right eye image R', which have undergone conversion with the doubled frame frequency. Accordingly, since it is not necessary to display this black image, and in order to suppress 3D crosstalk being the transition state of making a response, the light source section 6 is turned off for this period. That is, control should be exerted such that light is emitted by 50% of cycle T or less than that. Note that, as the light emitting period is shorter, 3D crosstalk can more be suppressed.

Figure 6:
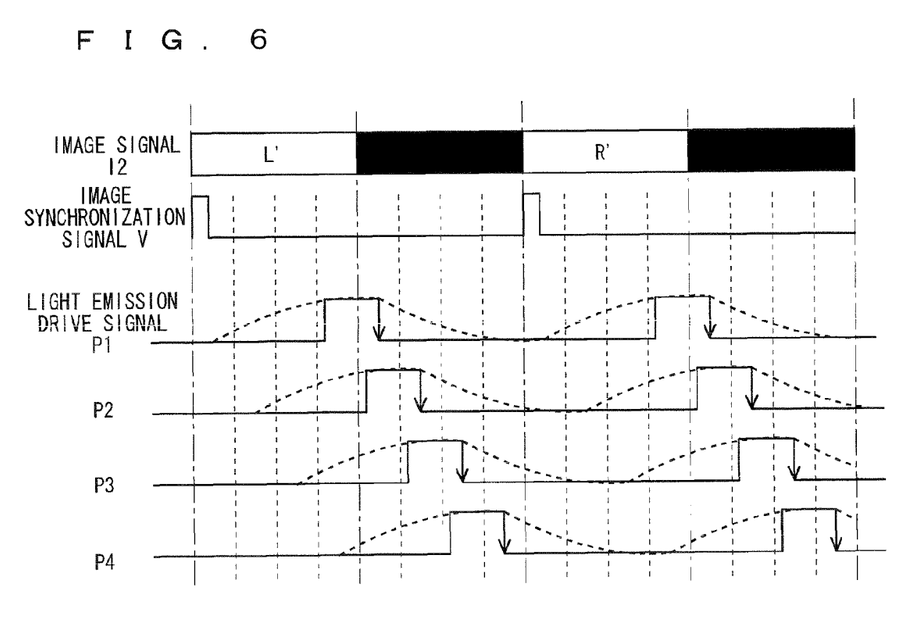
FIG. 6 is another exemplary timing chart showing the timing of generating the light emission drive signal.

In the case where the number of vertical division of the light source section 6 is small, since each of the divided regions of the light source section 6 has much width, the scan timing of the liquid crystal panel section 8 is different between the top portion and bottom portion of the divided light source section 6. For example, when the number of vertical division n is 4, the width is ¼ as great as the period of the vertical scanning. Accordingly, as shown in FIG. 6, the phases of the light emission drive signals P1 to P4 may be uniformly delayed taking into consideration of the image scan start time at the center of the width of th light source section 6. That is, though the light emission drive signal is generated based on that P1 is the scan start point of the vertical topmost portion in FIG. 5, in FIG. 6, the phases are uniformly delayed based on that the scan start point of P1 is ⅛ period, which corresponds to half of the ¼ period of the vertical scanning.

Further, though it has been described that the position of the image beginning to change to be the black image is the falling of the light emission drive signal P1, the position may be slightly delayed from the position of the image beginning to change to be the black image, and the phases of the light emission drive signals P1 to P4 may be uniformly delayed such that peak of the response of liquid crystal is included in the light emitting period. In this manner, the phase of the light emission drive signal Pn is structured to be adjustable.

In this manner, by successively turning on the divided regions of the light source section 6 in synchronization with scanning of the image, the light emission timing of the light source section 6 corresponding to the response of liquid crystal can be optimized both at the top portion or bottom portion of the liquid crystal panel section 8, and 3D crosstalk can be suppressed.

In connection with the light emitting element such as laser or LED, the light emission intensity may change by the variations in temperature and aging of the element. Further, such a light emitting element itself individually varies in the light emission amount. Therefore, the color balance of the light source may change and unintended coloring or unevenness in color may appear in the displayed image. Accordingly, the light detection section 4 is provided for adjusting the light emission intensity of the light source section 6, and the timing generation section 2 generates the light detection gate signal GE for enabling detection of the light detection section 4.

It is the optimum to carry out this light detection at the timing where the divided regions of the light source section 6 are turned on at the same time. In the case where the light detection is simply carried out with the light detection gate signal GE whose timing is identical to the light emitting period, and where the light source section 6 is vertically divided and control is exerted such that the light emission timing is time-shifted, there is no timing at which all the regions of the light source section 6 emit light at the same time. Furthermore, since the light is diffused by the light guide plate, there is problem that the light detection amount does not become constant as being affected by the divided regions of the light source section 6 surrounding the installed optical sensors.

For example, in FIG. 5, in the case where the light detection is carried out for all the regions of the light source section 6 at the timing identical to P1, the region driven at P2, which is adjacent to the region driven at P1, emits light at the later stage of the light emission timing of P1. Therefore, the light detection amount does not become constant. Further, when the user increases or reduces the luminance of the light source section 6, the length of the light emitting period is controlled. Therefore, the degree of overlap of light in adjacent regions of the light source section 6 varies, and hence the light detection amount does not become constant. For example, when the user reduces the luminance of the light source section 6 and shortens the light emitting period, though overlap of light in adjacent regions is eliminated, but the light detection amount reduces.

On the other hand, when the user increases the luminance of the light source section 6, in connection with the overlap of light in adjacent regions in the light source section 6, the width of each overlapped portion changes depending on the shift amount which is determined by the number of vertical division, and hence the light detection amount does not become constant. Accordingly, control is exerted such that all the regions of the light source section 6 emit light at the timing corresponding to the boundary between the left eye image and the right eye image.

Figure 7:
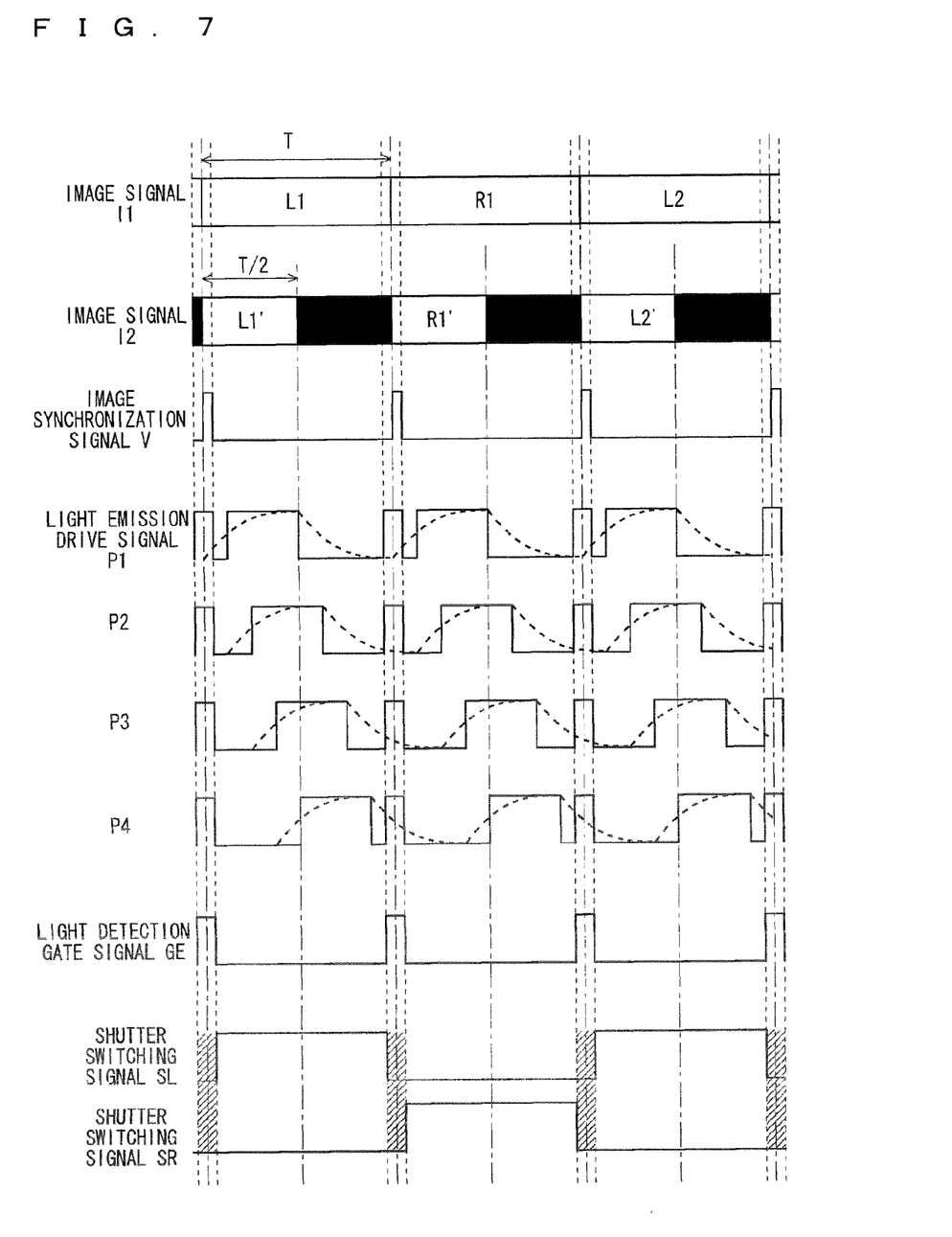
FIG. 7 is a timing chart showing light detection and shutter switching control.

FIG. 7 is a timing chart showing the light detection and shutter switching control. The number of vertical division n of the light source section 6 is 4, similarly to the example shown in FIG. 6. As shown in FIG. 7, the timing generation section 2 generates pulses in the light emission drive signals P1 to P4, to cause all the regions of the light source section 6 to emit light at the timing corresponding to the boundary between the left eye image L and the right eye image R (predetermined period), i.e., around the rising timing of the image synchronization signal V.

Further, the timing generation section 2 generates, at the timing corresponding to the boundary between the left eye image L and the right eye image R of the image signal I1, which is identical to the timing of the light detection gate signal GE of the light detection section 4, pulses in the light emission drive signal Pn for enabling synchronous light emission. The light emitting period of each pulse of the light emission drive signal Pn for enabling synchronous light emission is determined by the sensitivity and light amount of the optical sensors of the light detection section 4. The period is preferably as short as possible. For example, it is optimum if it can be set to so short time that it can be detected by the optical sensors but cannot be sensed by human eyes. Further, when this light emitting period is increased, it may overlap with the light emitting period described above. In this case, the overlap period is permitted because light is emitted.

Though stable light detection is achieved by exerting control to cause all the regions of the light source section 6 to emit light at the same time, because of the light detection, an image in the course of response of liquid crystal may be shown in the light emitting period of the light source section 6, whereby 3D crosstalk may appear. Accordingly, the timing generation section 2 generates, in the light emitting period of the light source section 6 for light detection, the shutter switching signals SL, SR for switching the left and right eye shutters to the non-transmissive mode. Thus, 3D crosstalk is suppressed by the right and left eye shutters of the shutter glasses section 9 being closed. The shutter switching signals SL, SR function to allow an image to be transmissive by opening the shutters in High period; and function to allow an image to be non-transmissive by closing the shutters in Low period. The hatched portions in FIG. 7 each represent the period in which the left and right eye shutters are closed.

Note that, for example in the case where the left and right eye shutters of the shutter glasses section 9 are structured with liquid crystal, the response time may be slow. Taking into consideration of the response being slow, it is also possible to adjust the rising and falling timing and High period of the shutter switching signals SL, SR, such that the left and right eye shutters are fully in the non-transmissive mode at the timing where all the regions of the light source section 6 emit light.

As has been described above, with the stereoscopic image display device according to the first preferred embodiment, the timing generation section 2 generates the light emission drive signal Pn for causing all the regions of the light source section 6 to emit light in a predetermined period, and generates the light detection gate signal GE for enabling detection of the light detection section 4. Therefore, the light detection section 4 can perform detection in the state where all the regions of the light source section 6 emit light at the same time. Accordingly, the light detection section 4 can stably perform detection of the light detection value D with small errors, without being affected by the amount of light in adjacent regions of the light source section 6. Since the light source control section 5 controls the light emission intensity of the light source section 6 based on the light detection value D with small errors, the illumination color of the light source section 6 can be maintained to be constant against variations in the temperature and aging of the light source section 6. Thus, long-term use of the light source section 6 is realized.

Further, since the timing generation section 2 generates the shutter switching signals SL, SR for switching the left and right shutters to the non-transmissive mode in the predetermined period, by switching the left and right shutters to the non-transmissive mode in the period in which all the regions of the light source section 6 are caused to emit light at the same time, 3D crosstalk attributed to light emission of the light source section 6 can be suppressed.

Still further, the light guide section 7 outputting light, which is received from the light source section 6, to the liquid crystal panel section 8 is further provided, and the light detection section 4 is installed between the light guide section 7 and the liquid crystal panel section 8. Therefore, the light detection section 4 can be installed at any position between the light guide section 7 and the liquid crystal panel section 8, and flexibility in installing the light detection section 4 is enhanced.

Still further, since the image signal I2 is a signal in which a black image is inserted between the left eye image L' and the right eye image R' having undergone conversion with the doubled frame frequency, the left eye image L' and the right eye image R' can be separated from each other by the black image.

Note that, since the brightness of the light source section 6 varies depending on the temperature of the light source section 6 itself and the light emission accumulation time, the reference value recording section 3 may record and retain the reference light detection value MD and the reference light emission intensity value ME for each condition, i.e., the temperature of the light source section 6 and the time having been elapsed since beginning of use. For example, setting the reference light emission intensity value ME for each of the cases where the temperature of the light source section 6 is low and where it is high brings about the effect of achieving faster convergence to the targeted color. Further, for example, since the brightness reduces after a lapse of several years since beginning of use, the reference light detection value MD may be maintained, to keep the original brightness despite being applied with voltage. The reference light detection value MD may reduce in accordance with the light emission accumulation time of the light source section 6. That is, the reference value recording section 3 may reduce the value of the reference light detection value MD such that the targeted brightness is gradually reduced as the time elapses. Thus, the electric power can be made constant.

Further, the reference value recording section 3 may record and retain the light emission intensity value E obtained when the light source section 6 is turned off, and use the light emission intensity value E as the initial value of the light emission intensity of the light source section 6 for the next emission of light. This brings about the effect of faster convergence to the targeted color. Further, the reference value recording section 3 may record and retain the reference light detection value MD and the reference light emission intensity value ME for each condition, i.e., the white color and the color temperature of the targeted output light. Thus, the light source section 6 can switch the setting of color temperature and the like.

Still further, it has been described that the light emission drive signal Pn causing the divided regions of the light source section 6 to emit light at the same time and the corresponding light detection gate signal GE and shutter switching signals SL, SR are generated for each frame, and that the light source control section 5 operates to equalize the light detection value D detected by the light detection section 4 with the targeted reference light detection value MD. However, in the case where the light emission intensity of the light source section 6 does not vary for each frame, the timing generation section 2 may generate the light emission drive signal Pn, the light detection gate signal GE, and the shutter switching signals SL, SR not for each frame but for each predetermined cycle longer than one frame.

That is, for example, it is also possible to cause the regions of the light source section 6, which regions being divided once in several frames, or every several seconds or minutes, to emit light at the same time to perform light detection, and to switch the left and right eye shutters to the non-transmissive mode. Thus, the processes required for the light source control section 5 to exert control of feeding back the light detection value D to the light source section 6 can be reduced.

Second Preferred Embodiment

Figure 8:
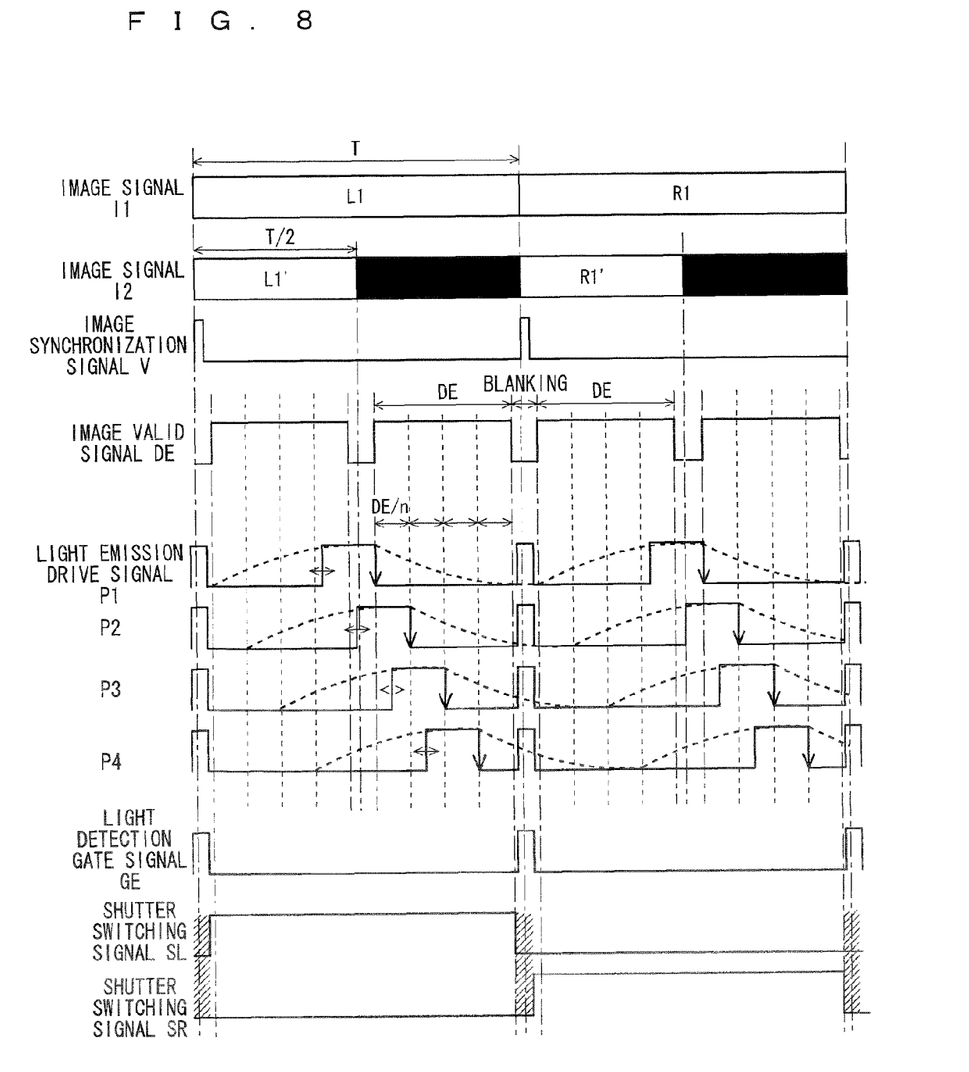
FIG. 8 is a timing chart showing light detection and shutter switching control exerted in a stereoscopic image display device according to a second preferred embodiment.

Next, a description will be given of a stereoscopic image display device according to a second preferred embodiment. FIG. 8 is a timing chart showing the light detection and shutter switching control exerted in the stereoscopic image display device according to the second preferred embodiment. Note that, in the second preferred embodiment, identical reference characters are allotted to the constituent elements similar to those described in connection with the first preferred embodiment, and the description thereof will not be repeated.

In the first preferred embodiment, the timing generation section 2 determines the phase shift amount of the light emission drive signal Pn based on the image synchronization signal V having been determined with reference to the vertical cycle of the image signal I2. On the other hand, in the present preferred embodiment, the determination is made with reference to an image valid signal DE, in place of the image synchronization signal V.

The image valid signal DE indicates the period where an actual image is present in one frame period of the image. In the liquid crystal panel section 8, synchronous scanning is performed with the image when the image valid signal DE is in High period, such that a write operation is carried out. One frame period of the image is equal to the sum of an image valid period and a blanking period. The blanking period refers to the period in which no image is written. For example, with a normal Hi-Vision signal, vertical 1080 lines correspond to the image valid period, while the total number of lines in the vertical cycle is 1125. The difference, i.e., 45 lines, corresponds to the blanking period.

Next, a detailed description will be given of the operation of the light detection and shutter switching control. As shown in FIG. 8, the image converting section 1 converts the input image signal I1 such that the frame frequency is doubled, and inserts one black image between a left eye image L' and a right eye image R', to generate and output an image signal I2. Further, an image synchronization signal V indicative of the head timing of the left eye image L' and that of the right eye image R' being synchronized with the image signal I2, and an image valid signal DE are output. Here, High period of the image valid signal DE is the image valid period, and Low period is the blanking period.

Further, each wavy line indicates the response of liquid crystal, and each solid line indicates the light emission drive signal Pn. For the sake of convenience, it is exemplarily shown that the number of vertical division n of the light source section 6 is 4. The shift amount S of the light emission drive signal is determined by the image valid signal DE and the number of vertical division n of the light source section 6, and expressed by the following equation. Here, in the following equation, DE represents the image valid period.

$$S = DE/n$$

In this manner, the falling timing of the light emission drive signal Pn is time-shifted by the shift amount S. At this time, in order to indicate the head timing of the left eye image L' and that of the right eye image R' of the image synchronization signal V, time-shifting is carried out by the shift amount S with reference to the rising of image valid signal DE, which is T/2 cycle after the rising of the image synchronization signal V. In calculating the shift amount S, the image valid period immediately after the rising of the image synchronization signal V is not used, and the next image valid period is used.

Similarly to the first preferred embodiment, pulses for causing all the regions of the light source section 6 to emit light is generated at the timing corresponding to the boundary between the left eye image L and the right eye image R of the image signal I1. More specifically, pulses for causing all the regions of the light source section 6 to emit light are generated in the light emission drive signals P1 to P4 around the rising timing of the image synchronization signal V. Further, at the same timing, the timing generation section 2 generates pulses in the light detection gate signal GE, and generates the shutter switching signals SL, SR for switching the left and right eye shutters to the non-transmissive mode.

As has been described above, with the stereoscopic image display device according to the second preferred embodiment, the timing generation section 2 determines the shift amount S of the light emission drive signal Pn with reference to the image valid signal DE and generates the light emission drive signal Pn. Therefore, the synchronization with the image write scanning can be achieved more strictly. Further, the light emission timing of the light source section 6 corresponding to the response of liquid crystal can be optimized both at the top portion and bottom portion of the liquid crystal panel section 8, and 3D crosstalk can be suppressed.

Third Preferred Embodiment

Figure 9:
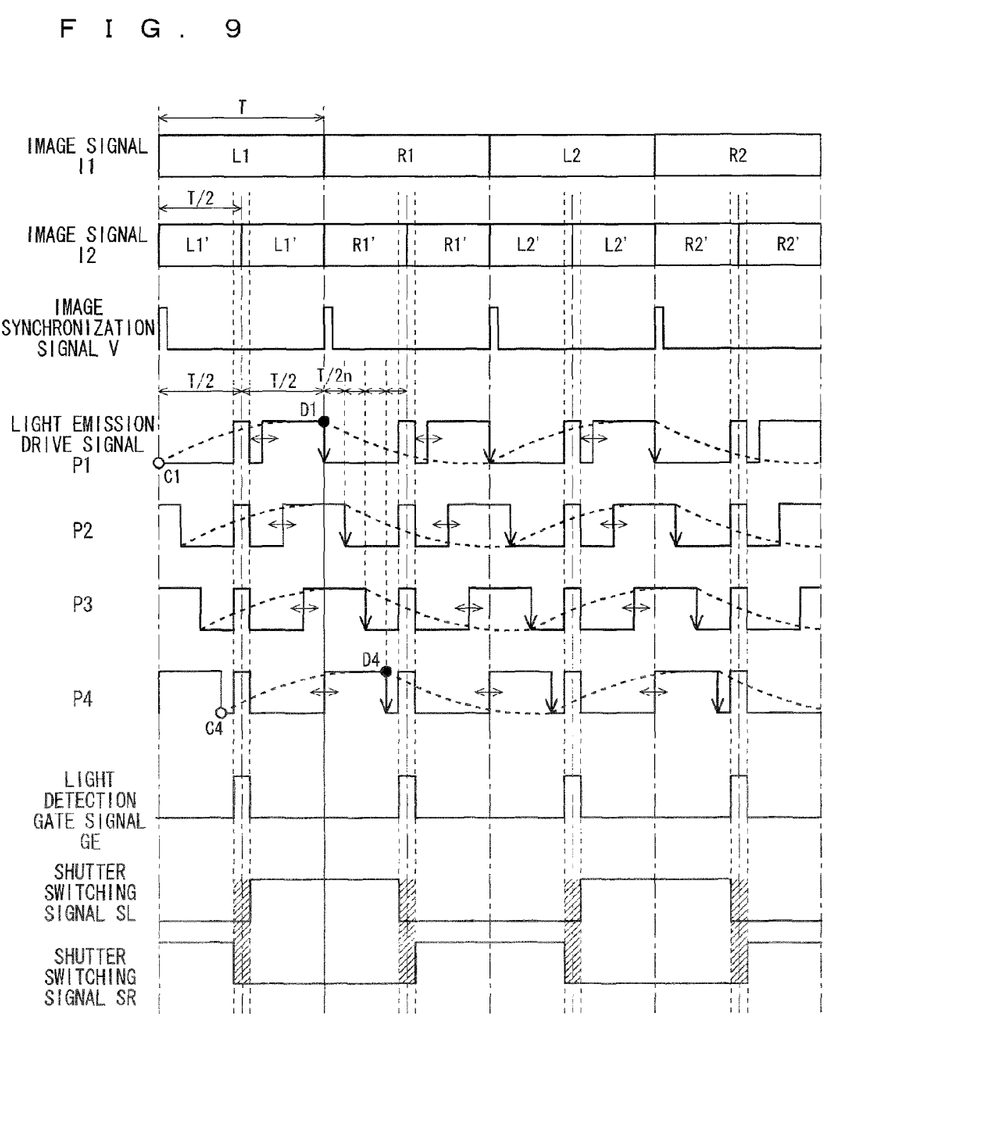
FIG. 9 is a timing chart showing light detection and shutter switching control exerted in a stereoscopic image display device according to a third preferred embodiment.

Next, a description will be given of a stereoscopic image display device according to a third preferred embodiment. FIG. 9 is a timing chart showing the light detection and shutter switching control exerted in the stereoscopic image display device according to the third preferred embodiment. Note that, in the third preferred embodiment, identical reference characters are allotted to the constituent elements similar to those described in connection with the first and second preferred embodiments, and the description thereof will not be repeated.

In the first and second preferred embodiments, the image converting section 1 converts the input image signal I1 such that the frame frequency is doubled, and inserts one black image between a left eye image L' and a right eye image R', to generate an image signal I2. The third preferred embodiment is different from the first and second preferred embodiments in that, after the frame frequency is doubled, the same image is inserted twice without inserting any black image.

As shown in FIG. 9, it is understood that the image signal I1 is an image in which a left eye image L and a right eye image R from two eyepoints are sorted to form a pair of left eye image L and right eye image R in a time-sharing manner. In the case where the image signal I1 is input in order of L1, R1 . . . with one image frame period T, the image converting section 1 doubles the frame frequency, and thereafter performs conversion to achieve the order of L1', L R1', R1' . . . with one image frame period T/2. That is, the image converting section 1 performs the operation of inserting the identical input image twice.

In connection with the light emission drive signals shown in FIG. 9, each wavy line indicates the response of liquid crystal, and each solid line indicates the light emission drive signal Pn of the light source section 6. For the sake of convenience, it is exemplarily shown that the number of vertical division n of the light source section 6 is 4. For the sake of convenience, it is understood that, in the image signal I2 being input to the liquid crystal panel section 8, the left eye image L is a full white image and the right eye image R is a full black image. When the wavy line rises, the transmittance increases; when the wavy line lowers, the transmittance reduces. Point C1 is the point where the write operation of the left eye image L1' corresponding to the area near the topmost portion of the liquid crystal panel section 8 is performed with the full-white gray scale level. Though the write operation of the same L1' image is performed with the full-white gray scale level after a lapse of T/2 period, the response of liquid crystal is unchanged because the images are totally identical to each other.

Point D1 is the point where the write operation of the black image, which is the next R1' image, is performed. It can be seen that the point immediately before point D1 is the point where an adequate response time has elapsed, and where the substantially targeted transmittance corresponding to the left eye image L1' is achieved. That is, it can be seen that it is optimum to cause the light source section 6 to emit light with reference to point D1.

On the other hand, point C4 is the point where the write operation of the left eye image L1' corresponding to the upper ¾ portion of the liquid crystal panel section 8 is performed with the gray scale level. Point C4 is shifted rightward in accordance with the lapse of time from point C1. Point D4 is the point where the write operation of the black image, which is the next right eye R1' image, at the upper ¾ portion of the liquid crystal panel section 8 is performed. It can be seen that, at the upper ¾ portion of the screen also, the point immediately before point D4 is the point where the substantially targeted transmittance corresponding to the left eye image L1' is achieved.

In this manner, it is optimum to cause the light source section 6 to emit light with reference to the area near points D1, D2, ..., Dn. While the start position of Dn is different from the first preferred embodiment, the time-shift of the light emission drive signal Pn is started from the boundary between the left eye image L' and the right eye image R' of the image signal I2. Similarly to the first preferred embodiment, the shift amount S of the light emission drive signal Pn is determined by the cycle T of the image synchronization signal V and the number of vertical division n of the light source section 6, which is expressed by the following equation:

$$S = T/2n$$

When T period has elapsed since the rising of the image synchronization signal V, the falling of the first light emission drive signal P1 is generated, such that light emission drive signal Pn is generated as being time-shifted by shift amount S. For example, with the light source section 6 with four divided regions, the falling point of P1 occurs after a lapse of T period since the rising of the image synchronization signal V, and the falling point of P2 occurs after a lapse of T+T/8 period. Note that, similarly to the second preferred embodiment, the timing generation section 2 may determine the shift amount S with reference to the image valid signal DE in place of the image synchronization signal V, and generate the light emission drive signal Pn.

The third preferred embodiment is different from the first and second preferred embodiments in the timing where pulses for causing the divided regions of the light source section 6 to emit light at the same time. Since the image converting section 1 does not insert a black image after the frame frequency is doubled but inserts the same image twice, the timing generation section 2 generates pulses at the same time for the light emission drive signals P1 to Pn after a lapse of about T/2 period since the rising of the image synchronization signal V. Further, the timing generation section 2 generates pulses for the light detection gate signal GE and the shutter switching signals SL, SR for switching the left and right eye shutters to the non-transmissive mode, at the timing identical to that of the light emission drive signals P1 to Pn.

As has been described above, with the stereoscopic image display device according to the third preferred embodiment, the image converting section 1 doubles the frame frequency and thereafter inserts the same image twice. Therefore, the time until the liquid crystal fully responds can be secured, and a reduction in luminance in 3D mode due to slow response of liquid crystal and crosstalk can be suppressed.

While the invention has been shown and described in detail, the foregoing description is in all aspects illustrative and not restrictive. It is therefore understood that numerous modifications and variations can be devised without departing from the scope of the invention.

What is claimed is:

1. A stereoscopic image display device, comprising:
    a liquid crystal panel section in which successive scanning is performed in a predetermined direction in synchronization with an image signal, so that transmittance of light is varied in accordance with a gray scale level of said image signal;
    a light source section being divided into a plurality of regions;
    a light detection section detecting light emission intensity of said light source section;
    a light source control section controlling the light emission intensity of said light source section based on a light detection value detected by said light detection section;
    a shutter glasses section having left and right shutters, said shutter glasses section switching said left and right shutters between a transmissive mode and a non-transmissive mode; and
    a timing generation section generating, in synchronization with an image synchronization signal, a light emission drive signal causing said light source section to emit light, a light detection gate signal causing said light detection section to detect the light emission intensity of said light source section, and a shutter switching signal for causing said left and right shutters to switch between the transmissive mode and the non-transmissive mode,
    wherein said timing generation section generates said light emission drive signal which causes each of said regions of said light source section to emit light in accordance with said scanning performed in said liquid crystal panel section, and which causes all the regions of said light source section to emit light in a predetermined period, and generates said light detection gate signal which enables detection of said light detection section in said predetermined period, and generates said shutter switching signal for switching said left and right shutters to the non-transmissive mode.

2. The stereoscopic image display device according to claim 1, wherein
    said timing generation section generates said light emission drive signal with reference to an image valid signal, in place of said image synchronization signal.

3. The stereoscopic image display device according to claim 1, further comprising
    a light guide section outputting light received from said light source section to said liquid crystal panel section, wherein
    said light detection section is installed between said light guide section and said liquid crystal panel section.

4. The stereoscopic image display device according to claim 1, wherein
    said image signal is a signal having a black image inserted between a left-eye dedicated image and a right-eye dedicated image both being converted with a doubled frame frequency.

5. The stereoscopic image display device according to claim 1, wherein
    said image signal is a signal having an identical image successively inserted twice to a left-eye dedicated image and a right-eye dedicated image both being converted with a doubled frame frequency.

6. The stereoscopic image display device according to claim 1, wherein
    said timing generation section generates said light emission drive signal, said light detection gate signal, and said shutter switching signal, for each predetermined cycle being longer than one frame of said image signal.

7. The stereoscopic image display device according to claim 1, wherein
    said light source control section controls the light emission intensity of said light source section, based on said light detection value detected by said light detection section and a reference light detection value set previously, and said reference light detection value reduces in accordance with a light emission accumulation time of said light source section.

8. The stereoscopic image display device according to claim 1, wherein said light source control section controls the light emission intensity of said light source section, based on said light detection value detected by said light detection section and a reference light detection value set previously, and a reference light emission intensity value, which is an initial value of the light emission intensity of said light source section, is set for each of conditions including temperature of said light source section and a light emission accumulation time of said light source section.

9. The stereoscopic image display device according to claim 1, wherein said light source control section records and retains a light emission intensity value obtained when said light source section is turned off, said light emission intensity value being used as an initial value of the light emission intensity of said light source section for next emission of light.

* * * * *